(No Model.)

A. G. MACDONELL.
AUTOMATIC ADVERTISING TABLE.

No. 283,408. Patented Aug. 21, 1883.

Witnesses:

Inventor:
Allan G. Macdonell

UNITED STATES PATENT OFFICE.

ALLAN G. MACDONELL, OF NEW YORK, N. Y.

AUTOMATIC ADVERTISING-TABLE.

SPECIFICATION forming part of Letters Patent No. 283,408, dated August 21, 1883.

Application filed March 2, 1883. (No model.)

*To all whom it may concern:*

Be it known that I, ALLAN G. MACDONELL, of the city, county, and State of New York, have invented certain new and useful Improvements in Tables for Advertising Purposes, of which the following is a specification.

My invention has reference to tables used for advertising purposes; and it relates, principally, to the manner of holding and displaying the advertisements by means of automatically-moving disks on which the advertisements are inscribed or displayed at certain intervals, the motion being imparted by suitable mechanism. It is this feature that principally characterizes my invention. It can be best understood and explained by reference to the accompanying drawings, in which—

Figure 1:
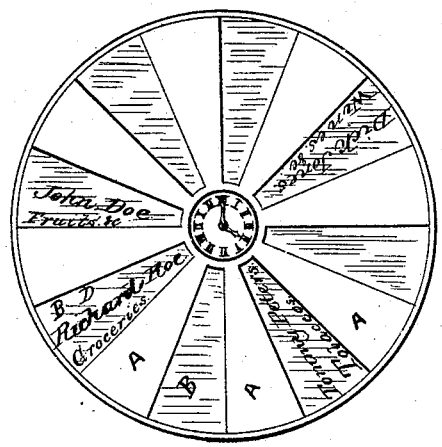
Figure 2:
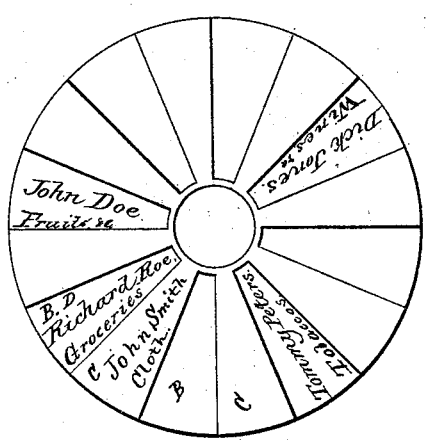
Figure 3:
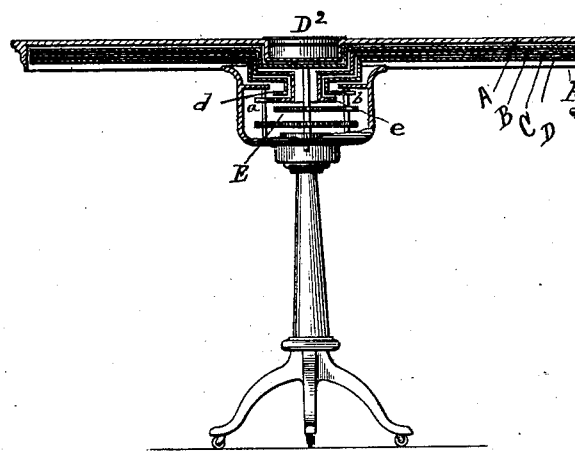

Figure 1 is a plan view of the top of the table, showing the alternate opaque and transparent sectors. Fig. 2 is a plan view of the sector advertising-wheels, which are placed within the table and viewed through the transparent sectors of the table-top. Fig. 3 is an upright sectional view of the table, showing the cavity within the table for the revolving sector-wheels and clock-work; and Fig. 4 is a side view of the table, with a portion of the edge of the table-top removed, showing a modified device for connecting the clock-work and sector-wheels.

I make the top of the table, Fig. 1, either entirely of glass, with sectors A rendered opaque, alternating with transparent sectors B, through which the sector advertising-wheels of Fig. 2 appear, as shown, or otherwise construct the top partly of glass and partially of wood or other opaque material by using alternate sectors of each. Under the glass, within the body of the table-top, are sector-wheels B C D, Figs. 2 and 3, made of thin plates of any suitable material, the spaces between the open sectors of each wheel being sufficiently large to bring to view the sectors of the wheel next underneath it. Upon the opaque sectors of each wheel are printed or painted advertisements, a number of which are to be exhibited at each interval of movement of the wheels through the several transparent sectors A of the table-top. The sector-wheels B C D are moved one after another, having a step-by-step movement equaling the space of a single sector. These movements are at intervals, sufficient length of time elapsing between each movement for the several advertisements at any time in view to be read. The sector-wheels connect with the driving clock-work E by central thimble-gears, as shown, Fig. 3, the driving-wheels of the clock-work, which connect with the thimble-gears, being segmental and giving interval movements as required. The wheels of the clock-work, as *a b*, which connect with the thimble-gears of the sector-wheels, are segmental, the toothed segment of each wheel having only a sufficient number of teeth to drive during a single turn its sector-wheel only through the space occupied by a single sector, in order to make a single change of the positions of the sectors, either to carry the sectors out of or into view. The wheels *a b* have such a relation to each other in their movements and the positions of their toothed segments as to cause each sector-wheel to move only while the other sector-wheels are at rest, each sector-wheel having a period of rest equaling the entire time of movement and display of all the other sector-wheels of the set. The toothed segments of the wheels *a b* occupy, therefore, only a small part of the periphery of the wheels, the remaining portion being blank.

By the use of a number of sector-wheels a large number of advertisements can be displayed, and during each interval the entire number on a single wheel will appear. Now, if the sector-wheels are all placed so that all their advertising-sectors lie under the opaque sectors of the table-top, the bottom F of the cavity within the table-top will appear through the transparent sectors. I therefore place immovable advertisements on this bottom F, or a movable disk every sector of which is provided with an advertisement. The advertisements appearing from this disk are covered by the movement of the first sector-wheel, bringing wheel D into view, showing advertisements, as "John Doe and Richard Roe" in Fig. 2. The clock-work next moves wheel C and covers the sectors of wheel D, showing other advertisements, as "John Smith," &c. Thus the movements progress until all the wheels have been shown. During the successive movements of the wheels the clock-work makes a second movement of each wheel, which brings the sectors under the opaque portions of the table-top, so that after the appearance of the last wheel its second movement brings to view again the bottom disk, which has either retained or changed its position, as the case may be, and another showing of the advertisements begins and goes on as before. The clock-work E occupies the central portion of the cavity of the table-top, as shown, and may exhibit on the upper surface of said table-top a time-indicating dial, D².

Figure 4:
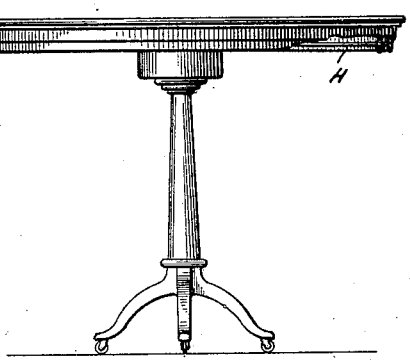

If desirable, the clock-work E may connect with the sector-wheels B C D at their periphery by means of a shaft or shafts, H, extending outward from the center of the table, as shown in Fig. 4. The sectors of the wheels I make removable, so that at any time any one may be changed for a new one without removing the entire wheel.

What I claim as my invention, and desire to secure by Letters Patent, is—

1. An automatic advertising-table having within a cavity in its table-top a series of sector advertising-wheels having alternate opaque and transparent sectors and open spaces, substantially as specified.

2. The combination, with a table-top having several opaque sectors and several transparent sectors, alternating in their arrangement, of sector advertising-wheels and mechanism for revolving the same, substantially as specified.

3. The combination, with the sector advertising-wheels and the clock-work, of an intermediate connecting mechanism having intermittent movements, for successively bringing to view the sectors of the several wheels through the transparent sectors of the table-top.

4. An advertising-wheel provided with removable and interchangeable sectors, substantially as described, to facilitate the change of advertisements, as desired.

ALLAN G. MACDONELL.

Witnesses:
 MERRITT GALLY,
 GEO. D. GARVIE.